United States Patent
Panda

(10) Patent No.: US 9,519,445 B2
(45) Date of Patent: Dec. 13, 2016

(54) PRINT DATA RETRIEVAL SYSTEM USING GRAPHICAL CODES

(71) Applicant: KYOCERA Document Solutions Inc., Osaka (JP)

(72) Inventor: Debashis Panda, Concord, CA (US)

(73) Assignee: KYOCERA Document Solutions Inc. (JP)

( * ) Notice: Subject to any disclaimer, the term of this patent is extended or adjusted under 35 U.S.C. 154(b) by 0 days.

(21) Appl. No.: 14/634,461

(22) Filed: Feb. 27, 2015

(65) Prior Publication Data

US 2016/0253127 A1 Sep. 1, 2016

(51) Int. Cl.
*G06F 3/12* (2006.01)
*G06K 19/06* (2006.01)
*G06K 7/14* (2006.01)

(52) U.S. Cl.
CPC ........... *G06F 3/1204* (2013.01); *G06F 3/1271* (2013.01); *G06K 7/1447* (2013.01); *G06K 19/06112* (2013.01)

(58) Field of Classification Search
CPC .... G06F 3/1204; G06F 3/1271; G06K 7/1447; G06K 19/6112
USPC ............. 358/1.15, 474, 468, 450, 462, 1.13; 235/375
See application file for complete search history.

(56) References Cited

U.S. PATENT DOCUMENTS

| | | | | |
|---|---|---|---|---|
| 6,045,048 A * | 4/2000 | Wilz, Sr. | ........... | G06F 17/30879 235/375 |
| 2004/0046987 A1 | 3/2004 | Mima | | |
| 2006/0262358 A1 * | 11/2006 | Kornfeld | ................ | G06Q 10/10 358/403 |
| 2009/0108057 A1 * | 4/2009 | Mu | ................... | H04M 1/72561 235/375 |
| 2010/0228821 A1 * | 9/2010 | Ono | ..................... | H04M 1/7253 709/203 |
| 2013/0262381 A1 * | 10/2013 | Fourcher | ........... | G06F 17/30058 707/634 |
| 2014/0108606 A1 * | 4/2014 | Beadles | ............ | G06F 17/30876 709/217 |
| 2014/0175165 A1 * | 6/2014 | Havens | .................. | G06Q 50/22 235/375 |
| 2014/0188922 A1 * | 7/2014 | Poyhonen | ........... | H04L 67/1063 707/758 |
| 2014/0325328 A1 * | 10/2014 | Beadles | .............. | G06F 17/2235 715/208 |

(Continued)

*Primary Examiner* — Jerome Grant, II
(74) *Attorney, Agent, or Firm* — McDonnell Boehnen Hulbert & Berghoff LLP

(57) ABSTRACT

The present disclosure is directed to an image forming apparatus. The image forming apparatus may include a network interface, an image-capture unit, a printing unit, and a processor configured to execute instructions. The instructions may include causing the image-capture unit to capture a representation of a graphical code displayed on a mobile computing device. The graphical code may be associated with print data. The instructions may also include causing the image forming apparatus to send via the network interface to the server a request for print data. The request may include the captured representation of the graphical code. The instructions may further comprise receiving, from the server via the network interface, the print data associated with the graphical code. Additionally, the instructions may include printing, via the printing unit, the received print data.

15 Claims, 7 Drawing Sheets

(56) References Cited

U.S. PATENT DOCUMENTS

| | | | | |
|---|---|---|---|---|
| 2015/0002870 A1* | 1/2015 | Burke, Jr. | ............. | G06F 3/1204 |
| | | | | 358/1.13 |
| 2015/0088561 A1* | 3/2015 | Charles | ................. | G06Q 10/02 |
| | | | | 705/5 |
| 2015/0235015 A1* | 8/2015 | Holler | ................... | G06F 21/105 |
| | | | | 726/27 |
| 2015/0289022 A1* | 10/2015 | Gross | ................ | H04N 21/4725 |
| | | | | 725/51 |

* cited by examiner

PRINT DATA RETRIEVAL SYSTEM USING GRAPHICAL CODES

BACKGROUND

Unless otherwise indicated herein, the materials described in this section are not prior art to the claims in this application and are not admitted to be prior art by inclusion in this section.

In recent years, data storage has transitioned from local storage into cloud-based storage. Previously, when transferring data between two devices, such data was often stored onto a local storage medium that was physically transported between the devices. However, it has become increasingly more common to store data from one device onto a networked server and access that networked server on another device.

As cloud storage becomes a more prevalent data storage solution, security of data stored online has become a greater concern. Typically, accessing data in the cloud requires some form of user authentication. In some instances, a user may be permitted to access certain data stored in a cloud after entering in a username and password, which may be a cumbersome process and cause an inconvenience to users.

A typical printing device may access cloud storage and retrieve data for printing therefrom. However, secured data in the cloud storage may require a user to enter in authentication credentials before the data can be retrieved and printed. Requiring such a log in process may inconvenience users and reduce the benefits gained from cloud-based printing.

SUMMARY

The present application discloses embodiments that relate to an image forming apparatus for print data retrieval using a graphical code. In one aspect, the present application describes a system. The system comprises a client device, a mobile computing device, a server, and an image forming apparatus. The client device is configured to generate print data and a graphical code associated with the print data. The print data is a printable representation of a document. The client device is also configured to transmit the print data and the graphical code to the server. The client device is further configured to provide the graphical code to the mobile computing device. The server is configured to store the print data and the associated graphical code received from the client device. The server is also configured to provide the print data to the image forming apparatus in response to receiving from the image forming apparatus a request comprising a captured representation of the graphical code. The mobile computing device includes a display unit. The mobile computing device is configured to display on the display unit the graphical code received from the client device. The image forming apparatus includes an image-capture unit. The image forming apparatus is configured to capture, via the image-capture unit, a representation of the graphical code displayed on the mobile computing device. The image forming apparatus is also configured to send a request to the server for the print data, wherein the request comprises the captured representation of the graphical code. The image forming apparatus is further configured to receive the print data from the server. Additionally, the image forming apparatus is configured to print the print data.

In another aspect, the present application describes a method. The method includes generating, at a client device, print data and a graphical code associated with the print data, wherein the print data is a printable representation of a document. The method also includes storing, at a server, the print data and the graphical code. The method further includes providing the graphical code to a mobile computing device. Additionally, the method includes displaying, on a display unit of the mobile computing device, the graphical code. Further, the method includes capturing, at an image-capture unit of an image forming apparatus, a representation of the graphical code displayed on the display unit of the mobile computing device. The method also includes sending, from the image forming apparatus, a request to the server for the print data. The request includes the captured representation of the graphical code. The method further includes transmitting, from the server, the print data to the image forming apparatus in response to receiving the request. The method additionally includes printing, via a printing unit of the image forming apparatus, the print data.

In yet another aspect, the present application describes an image forming apparatus. The image forming apparatus includes a network interface communicatively coupled to a network, an image-capture unit, a printing unit, and a processor. The processor is configured to execute instructions. The instructions include causing the image-capture unit to capture a representation of a graphical code displayed on a mobile computing device. The graphical code is associated with print data. The graphical code and the print data were generated on a client device and stored on a server communicatively coupled to the network. The instructions also include causing the image forming apparatus to send via the network interface to the server a request for print data. The request comprises the captured representation of the graphical code. The instructions further include receiving, from the server via the network interface, the print data associated with the graphical code. Additionally, the instructions include printing, via the printing unit, the received print data.

In another aspect, the present application describes a system. The system includes a means for generating, at a client device, print data and a graphical code associated with the print data, wherein the print data is a printable representation of a document. The system also includes a means for storing, at a server, the print data and the graphical code. The system further includes a means for providing the graphical code to a mobile computing device. Additionally, the system includes a means for displaying, on a display unit of the mobile computing device, the graphical code. Further, the system includes a means for capturing, at an image-capture unit of an image forming apparatus, a representation of the graphical code displayed on the display unit of the mobile computing device. The system also includes a means for sending, from the image forming apparatus, a request to the server for the print data, wherein the request comprises the captured representation of the graphical code. The system further includes a means for transmitting, from the server, the print data to the image forming apparatus in response to receiving the request. The system additionally includes a means for printing, via a printing unit of the image forming apparatus, the print data.

The foregoing summary is illustrative only and is not intended to be in any way limiting. In addition to the illustrative aspects, embodiments, and features described above, further aspects, embodiments, and features will become apparent by reference to the figures and the following detailed description.

DETAILED DESCRIPTION

Figure 1:
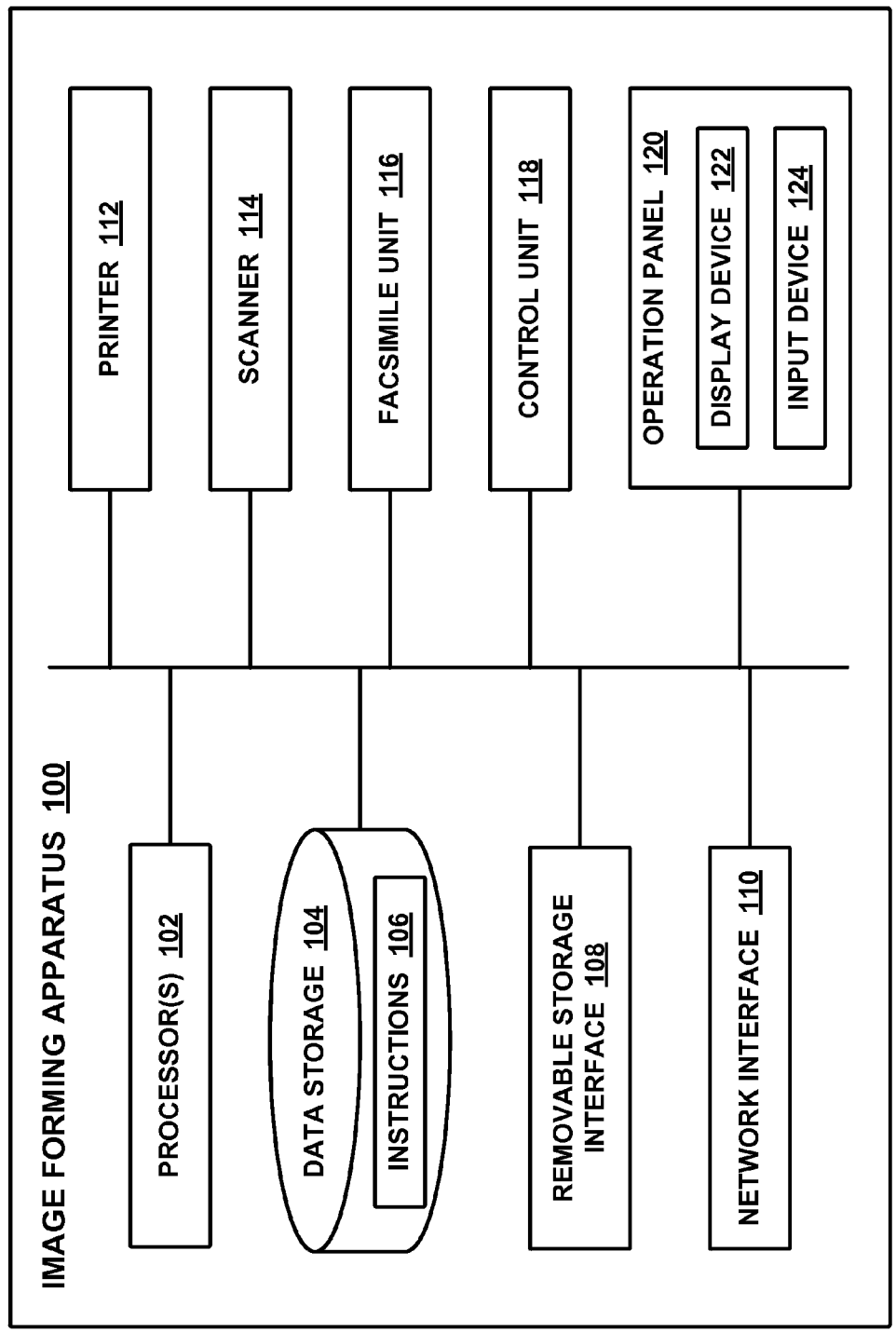
FIG. 1 is a schematic block diagram illustrating an image forming apparatus, according to an example embodiment.

Example methods and systems are described herein. Any example embodiment or feature described herein is not necessarily to be construed as preferred or advantageous over other embodiments or features. The example embodiments described herein are not meant to be limiting. It will be readily understood that certain aspects of the disclosed systems and methods can be arranged and combined in a wide variety of different configurations, all of which are contemplated herein.

Furthermore, the particular arrangements shown in the Figures should not be viewed as limiting. It should be understood that other embodiments might include more or less of each element shown in a given Figure. Further, some of the illustrated elements may be combined or omitted. Yet further, an example embodiment may include elements that are not illustrated in the Figures.

I. Overview

An example embodiment involves a graphical code-based print data retrieval system. A client device may generate print data representative of a document and a graphical code associated with that document. A server may store the generated print data and graphical code in association with each other for later retrieval. The client device may convey or otherwise transmit the graphical code to a mobile computing device. The mobile computing device may be configured to render or otherwise depict the graphical code on a display unit of the mobile computing device. An image forming apparatus equipped with a camera may capture an image of the graphical code shown on the display unit of the mobile computing device. The image forming apparatus may transmit a request to the server for print data associated with the captured graphical code. At the server, the received graphical code may be used to look up or otherwise find print data associated with the graphical code. The server may then transmit the print data to the image forming apparatus. The image forming apparatus may responsively print the print data onto a printing medium, such as paper.

The graphical code may be used as a basis for authenticating a user to print the print data. Whereas a typical authentication process requires the entry of user credentials, which may be time-consuming and inconvenient, employing a graphical code retrieval process described herein may be more convenient while maintaining or even providing improved security. For instance, user credentials may become compromised if they become known by others; however, a graphical code may only be provided to the user's mobile device and the server, so that the document can only be printed by accessing the graphical code on that particular mobile device.

Additional layers of security may be added in conjunction with this graphical code-based authentication. For example, the mobile computing device may require the entry of a passcode, fingerprint, or request the user to draw a pattern on screen to verify the user before displaying the graphical code. The server may store information representative of the graphical code (e.g. a hash value of the code) such that accessing the information stored on the server would not allow reproduction of the graphical code. The server and/or mobile computing device may otherwise encrypt or secure the information stored thereon as well.

In addition to improved security, a graphical code-based print data retrieval system may be extended to provide other conveniences. For example, multiple graphical codes may be generated that represent various versions of a document and/or various printing settings for a particular document. As another example, a graphical code may embed therein, in addition to an identification of a desired document to print, information about desired printing settings, user authentication credentials, and/or other additional commands for the image forming apparatus or the server to carry out.

II. Example Image Forming Apparatuses

FIG. 1 is a schematic block diagram of illustrating an image forming apparatus 100, according to an example embodiment. The image forming apparatus 100 includes processor(s) 102, data storage 104 that has stored thereon instructions 106, a removable storage interface 108, a network interface 110, a printer 112, a scanner 114, a facsimile (FAX) unit 116, a control unit 118, and an operation panel 120 that includes a display device 122 and an input device 124. Each unit of image forming apparatus 100 may be connected to a bus, allowing the units to interact with each other. For example, the processor(s) 102 may request information stored on data storage 104.

The processor(s) 102 may include one or more processors capable of executing instructions, such as instructions 106, which cause the image forming apparatus 100 to perform various operations. The processor(s) 102 may include general-purpose central processing units (CPUs) and cache memory. The processor(s) 102 may also incorporate processing units for specific purposes, such as application-specific integrated circuits (ASICs) and field-programmable gate arrays (FPGAs). Other processors may also be included for executing operations particular to image forming apparatus 100.

The data storage 104 may store thereon instructions 106, which are executable by the processor(s) 102. The data storage 104 may also store information for various programs and applications, as well as data specific to the image forming apparatus 100. For example, the data storage 104 may include data for running an operating system (OS). In addition, the data storage 104 may store user data that includes various kinds of information about any number of users. The data storage 104 may include both volatile memory and non-volatile memory. Volatile memory may include random-access memory (RAM). Some examples of non-volatile memory include read-only memory (ROM), flash memory, electrically erasable programmable read only memory (EEPROM), digital tape, a hard disk drive (HDD), and a solid-state drive (SSD). The data storage 104 may include any combination of readable and/or writable volatile memories and/or non-volatile memories, along with other possible memory devices.

The removable storage interface 108 may allow for connection of external data storage, which may then be provided to the processor(s) 102 and/or the control unit 118 or copied into data storage 104. The removable storage interface 108 may include a number of connection ports, plugs, and/or slots that allow for a physical connection of an external storage device. Some example removable storage devices that may interface with image forming apparatus 100 via the removable storage interface 108 include USB flash drives, secure-digital (SD) cards (including various shaped and/or sized SD cards), compact discs (CDs), digital video discs (DVDs), and other memory cards or optical storage media.

The network interface 110 allows the image forming apparatus 100 to connect to other devices over a network. The network interface 110 may connect to a local-area network (LAN) and/or a wide-area network (WAN), such as the Internet. The network interface may include an interface for a wired connection (e.g. Ethernet) and/or wireless connection (e.g. Wi-Fi) to a network. The network interface 110 may also communicate over other wireless protocols, such as Bluetooth, radio-frequency identification (RFID), near field communication (NFC), 3G cellular communication such as CDMA, EVDO, GSM/GPRS, or 4G cellular communication, such as WiMAX or LTE, among other wireless protocols. Additionally, the network interface 110 may communicate over a telephone landline. Any combination of wired and/or wireless network interfaces and protocols may be included in network interface 110.

The printer 112 may be any device or peripheral capable of producing persistent human-readable images and/or text on a printing medium, such as paper. The printer 112 may receive print data from other units of image forming apparatus 100 representing images and/or text for printing. The printer 112 may employ a variety of technologies, such ink-based printing, toner-based printing, and thermal printing, among other technologies. An assortment of mechanical and/or electro-mechanical devices may make up the printer 112 to facilitate the transportation of printing media and the transferring of images and/or text onto the printing media. For example, the printer 112 may include trays for the storage and staging of printing media and rollers for conveying the printing media through the printer 112. The printer 112 may also include ink heads for dispensing ink onto a printing medium, photosensitive drums onto which lasers are shone to charge the drums and attract toner that is transferred onto a printing medium, and/or a thermal head for heating certain areas of a printing medium to generate images and/or text. Other devices may also be incorporated within printer 112.

The scanner 114 may be any device that can scan a document, image, or other object (which may collectively be referred to as "scanning medium" hereinafter) and produce a digital image representative of that scanning medium. The scanner 114 may emit light (e.g. via LEDs) onto the scanning medium and sense the light reflecting off the scanning medium (e.g. via a charge coupled device (CCD) line sensor or a complementary metal oxide semiconductor (CMOS) line sensor). In some implementations, the scanner 114 includes a platen glass onto which a document may be placed to be scanned. In addition, the scanner 114 may perform post-processing on the scanned image, such as rotation, compression of the data, and/or optical character recognition (OCR), among other post-processing operations.

The facsimile unit 116 may scan a document and/or images (which may be collectively referred to as "printed material" hereinafter) and transmit the scanned printed material over a telephone line (i.e. fax the scanned printed material). The facsimile unit 116 may fax the scanned printed material via the network interface 110. The facsimile unit 116 may also receive a fax transmission and communicate the received data to the printer 112 for printing. In some implementations, the facsimile unit 116 includes buttons for configuring the facsimile unit 116 and dialling a phone number and a display for displaying the status of the fax transmission, among other things.

The control unit 118 may control various electrical and/or mechanical components of the image forming apparatus 100. For example, the control unit 118 may operate one or more paper sheet feeders, conveyors, rollers, and other mechanical devices for transporting paper through the printer 112. The control unit 118 may also include device drivers that facilitate network communication, electronic displays, and the reading of information from various sensors or readers coupled to the image forming apparatus 100. In some implementations, the control unit 118 is a software application or program that interfaces the processor(s) 102 with the various units of the image forming apparatus 100.

The operation panel 120 includes a display device 122 and an input device 124 for facilitating human interaction with the image forming apparatus 100. The display device 122 may be any electronic video display, such as a liquid-crystal display (LCD). The input device 124 may include any combination of devices that allow users to input information into the operation panel 120, such as buttons, a keyboard, switches, and/or dials. In addition, the input device 124 may include a touch-screen digitizer overlaid onto the display device 122 that can sense touch and interact with the display device 112.

Figure 2:
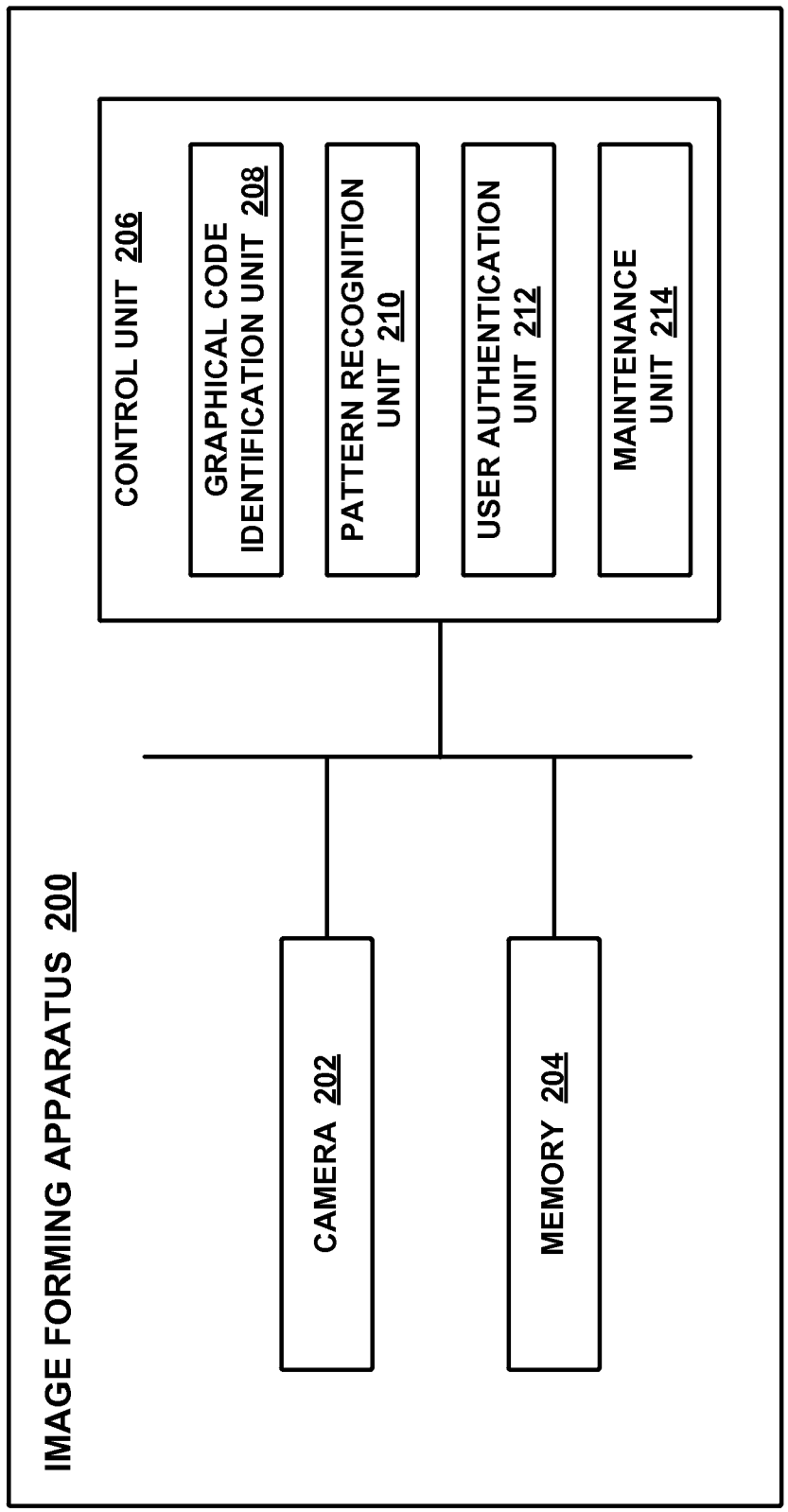
FIG. 2 is a schematic block diagram illustrates an image forming apparatus, according to an example embodiment.

FIG. 2 is a schematic block diagram of illustrating an image forming apparatus 200, according to an example embodiment. Image forming apparatus 200 may include any combination of the units of image forming apparatus 100. Additionally, the image forming apparatus 200 includes a camera 202, a memory 204, and a control unit 206. The control unit 206 may include a graphical code identification unit 208, a pattern recognition unit 210, a user authentication unit 212, and a maintenance unit 214.

The camera 202 may be any image-capture device capable of recording images and/or video. The camera 202 may include a combination of hardware and software operable to produce digital images and/or video from which objects can be detected, recognized, and/or tracked. The camera 202 may interface with the graphical code identification unit 208 to assist in recognizing and analysing graphical codes.

The memory 204 may be a storage device that stores images captured by the camera 202 and data associated with those stored images. The storage device may store images and other data to be transmitted to a server with a request for print data.

The graphical code identification unit 208 may be any combination of software modules that facilitate the identification and analysis of graphical codes. In some embodiments, the graphical code identification unit 208 receives a captured representation of a graphical code—for example, an image including a graphical code captured by camera 202—and identifies the graphical code included within the captured representation. The graphical code identification unit 208 may also read, decode, parse, or otherwise interpret the graphical code and extract information therefrom. A graphical code may embed information including a link to print data stored on a server, the name of the linked print data, printer settings associated with that print data, and other metadata associated with the print data, among other information; these pieces of information may be extracted from a graphical code by the graphical code identification unit 208. Some example graphical codes include 1-dimensional barcodes, 2-dimensional matrix barcodes—such as quick response (QR) codes—or any other optical machine-readable representation of data.

In some cases, a graphical code may be an image; in such cases, the graphical code identification unit 208 might identify the portion of a received image that contains the graphical code, which may subsequently be transmitted to a server. The server may employ image recognition techniques in order to determine similarities between the graphical code and stored images.

The pattern recognition unit 210 may be any combination of software modules that facilitate the recognition of patterns, handwriting, or other symbols that have drawn on a touch screen, graphics tablet, or other drawing-based digitizer. In some embodiments, the image forming apparatus 200 may require an input of a pattern to authenticate a user. A user may draw, trace, or otherwise enter a pattern on a touch screen of a mobile computing device or a digitizer on the image forming apparatus 200. The pattern recognition unit 210 may interpret the input and determine whether it matches a particular pattern. The pattern may be associated with an image forming apparatus, a user, or a group of users.

In some instances, the user may draw a pattern onto a fixed grid. The pattern recognition unit 210 may determine, for example, the points of the grid that were drawn over and the order in which the points were drawn. The pattern recognition unit 210 may also then compare the determined information about the input pattern determine if it matches a stored pattern. In this scenario, a "match" may indicate an exact match between an input pattern and a stored pattern.

In other cases, the user may draw a pattern without any restrictions on its shape. In these cases, the pattern may be any shape that can be drawn on a touch screen or digitizer. In some embodiments, the pattern recognition unit 210 may process the input pattern and attempt to identify its intended shape. For example, the input pattern may be similar to the shape of a star, and the pattern recognition unit 210 may determine that the intended input pattern was that of a star. In other instances, the pattern recognition unit 210 may perform handwriting recognition in order to determine one or more drawn letters. In these scenarios, the pattern recognition unit 210 may employ shape recognition techniques or character recognition techniques in order to recognize the input pattern.

In other embodiments, the input pattern may be compared to a previously drawn input pattern to determine the extent of similarity between the two patterns. The pattern recognition unit 210 may employ object recognition techniques or machine-learning techniques in order to compute the similarity between the two patterns (e.g. 90% similarity). In these embodiments, a "match" may indicate that an input pattern is within a threshold extent of similarity (e.g. greater than 80% similarity) of a stored pattern.

In some implementations, a particular print data may be secured with a stored pattern. A request to retrieve that particular print data may include a graphical code and an input pattern. In some cases, the server may determine whether or not the input pattern matches a stored pattern associated with the graphical code, and may subsequently transmit the print data upon determining a match between the input pattern and the stored pattern. In other cases, the server may send the print data and stored pattern to the image forming apparatus 200, and the pattern recognition unit 210 may determine whether the input pattern matches the received stored pattern before permitting the printing of the received print data.

Regardless of the particular kind of pattern recognition utilized, the pattern recognition unit 210 may, upon determining a match between an input pattern and a stored pattern, permit the image forming apparatus 200 to retrieve print data from a server and print out that print data. In some embodiments, determining a match causes the user to be authenticated.

The user authentication unit 212 may be any combination of software modules that manages the authentication of one or more users on the image forming apparatus 200. A particular mobile device may be associated with a user, such that the user authentication unit 212 authorizes a user upon identifying a particular device. In some instances, a device may transmit information about a certain to the image forming apparatus 200, and the user authentication unit 212 may compare the user information of registered users to determine whether to permit or prohibit execution of operations of the image forming apparatus 200, such as cloud printing.

In some embodiments, the user authentication unit 212 may operate in conjunction with the pattern recognition unit 210 in order to authenticate a user. After the pattern recognition unit 210 has determined a match, the user authentication unit 212 may authenticate a user associated with the input pattern and maintain that user's registration for a certain length of time (e.g. 5 minutes). A user may then carry out multiple operations, such as multiple cloud printing operations using multiple graphical codes, without requiring a pattern input to authenticate before each operation. If an authentication fails—for example, if an input pattern does not match a stored pattern—the user authentication unit 212 may prohibit the user from performing graphical code-based cloud printing or other operations of the image forming apparatus 200.

The maintenance unit 214 may be any combination of software modules that is used to diagnose and service the image forming apparatus 200. The maintenance unit 214 may store certain graphical codes that are associated with certain maintenance commands and operations. The maintenance unit 214 may operate in conjunction with the graphical code identification unit 208 to identify a graphical code from a captured image and determine whether the graphical code is associated with a particular maintenance operation. The maintenance unit 214 may also operate with the user authentication unit 212 to authenticate a maintenance serviceperson. This authentication may be performed based on a graphical image associated with the maintenance serviceperson. In some embodiments, the pattern recognition unit 210 may facilitate the authentication of a maintenance serviceperson by identifying an input pattern that matches a stored pattern associated with the maintenance serviceperson. Maintenance operations include printing a test page and printing a maintenance report, among other possible maintenance operations. The maintenance unit 214 may transmit information to a mobile computing device that causes the mobile computing device to display selectable maintenance operations.

A "unit" as referred to herein may refer to a device, component, module, or other combination of electrical and/or mechanical elements that accomplish a particular task. In some instances, a unit may refer to a physical device that performs certain activities, such as the facsimile unit 116. In other instances, a unit may refer to a software module that executes operations for a certain purpose, such as the graphical code identification unit 208. Regardless of the combination of hardware and software components that make up a unit, it should be understood that units are operable to accomplish certain tasks, and may interact with other units through hardware and/or software interfaces.

Image forming apparatuses referred to herein may incorporate any combination of components from image forming apparatus 100 and/or image forming apparatus 200, among other possible components. For instance, an image forming apparatus may include a power supply that converts electrical power for use by various components. It should be understood that other additional components might also be included on a particular image forming apparatus.

III. Example Systems

Figure 3:
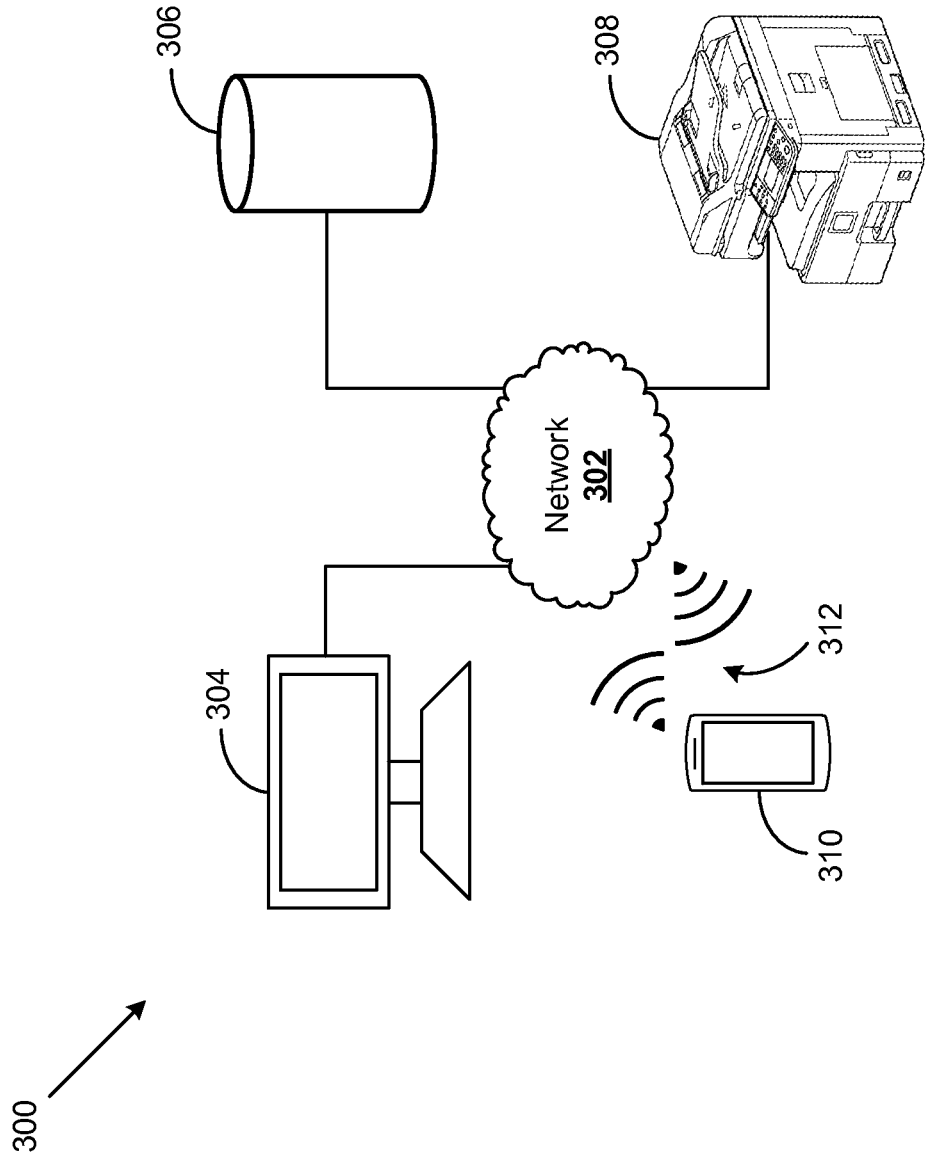
FIG. 3 is a schematic block diagram of a system, according to an example embodiment.

FIG. 3 is a schematic block diagram of a system 300, according to an example embodiment. The system 300 is an example system that includes a network 302 that is communicatively connected to client device 304, server 306, image forming apparatus 308, and mobile computing device 310.

The network 302 may be any type of network through which devices may communicate. In some embodiments, the network 302 is a local area network that communicatively connects the client device 304, server 306, image forming apparatus 308, and mobile computing device 310. In other embodiments, the network 302 is a wide area network, such as the Internet. In some instances, the network 302 includes a combination of local area network and wide area network. For example, server 306 may be remote and accessible over a wide area network, whereas the client device 304 and mobile computing device 310 are connected to the same local area network. It should be understood that the network 302 represents a communicative link through which devices can send data through and/or receive data from.

The client device 304 may be any computing device capable of generating print data and graphical codes. Although the client device 304 depicted in FIG. 3 is a desktop computer, other computing devices, such as laptops, tablets, and other computing devices may act as client device 304 for the purposes of print data and graphical code generation described herein. The client device 304 may include drivers (e.g. a cloud print driver) or other software modules that facilitate the generation of print data and the graphical data.

The server 306 may be any computing device capable of storing print data. The server 306 may store thereon a database containing stored entries of print data, where each entry includes at least print data and an associated graphical code. The database may be queried or otherwise searched using graphical codes. Such a query may involve the server 306 determining that a graphical code matches an entry using the above-described graphical code recognition techniques.

In some embodiments, the server 306 may store thereon a database of entries, where each entry includes at least print data and data representative of a graphical code. The server 306 may, in some cases, receive a graphical code within a request for print data. The server 306 may extract information from the received graphical code, and then use that extracted information to find matching data in the database. For example, a graphical code may represent a unique identifier containing a combination of alphanumeric characters; in this example, the server may extract a combination of alphanumeric characters from the received graphical code and compare it to a stored list of identifiers to find a matching print data entry. In some implementations, the identifier information may be extracted at an image forming apparatus, and the request for print data may include the extracted identifier.

Other data may also be stored within each entry of a database on the server 306. For example, printer configuration information representative of settings with which to print out a document may be stored within one or more entries. The print configuration information (which may also be referred to herein as "configuration setting information") may include color settings, duplex settings, a number of document pages to print per sheet of paper, and staple settings, among other possible configuration settings. In some embodiments, a server 306 may store multiple printer configuration settings. In addition to the printer configuration information, the database may also store metadata associated with the print data and information used to authenticate a user (e.g. one or more users that are authorized to access the print data).

In some embodiments, server 306 may be incorporated as a component of image forming apparatus 308. The image forming apparatus 308 may contain one or more processors and a storage device that may serve as a server 306. In such embodiments, the image forming apparatus 308 may recognize graphical codes, find matching graphical codes stored thereon, retrieve print data stored thereon, and execute print jobs entirely on the image forming apparatus 308 without accessing a separate server, such as server 306.

In some embodiments, the data representative of the graphical code may be a hash code generated based on the graphical code. The hash code may be generated by a client device before being sent to the server, or may be generated on the server after receiving the graphical code. Generating the hash code may involve inputting data representative of the graphical code into a hashing function. The hashing function may be a one-way mapping function that maps a particular graphical code to a unique combination of alphanumeric characters. The server 306 may provide a received graphical code (or a portion of data extracted from the received graphical code) to the hashing function, and then compare the output of the hashing function to stored hashes to determine if the graphical code is stored in the database.

In some embodiments, the entries within the database may be encrypted. A particular entry may be encrypted individually for a particular user. The particular user may provide authentication credentials (which may be embedded within a graphical code) or enter in a pattern to be authenticated. Authentication information associated with the user may be used to decrypt a particular entry in the database.

In some embodiments, a given entry in the database may be set to expire at a certain date and/or time. Upon reaching the expiration date and/or time, the server 306 may remove or delete the entry from the database.

The image forming apparatus 308 may implement various units and methods described in the present application. The image forming apparatus 308 may be similar to image forming apparatus 200 and/or image forming apparatus 100, and may implement any of the units of image forming apparatus 200 and image forming apparatus 100. The image forming apparatus 308 may include a camera that is configured to capture graphical codes displayed on mobile computing devices, such as mobile computing device 310.

The mobile computing device 310 may be connected to network 302 via a wireless connection 312. The mobile computing device 310 may include a touch screen through which information can be displayed and user input can be received. Alternatively, the mobile computing device 310 may include a display and separate input devices. The mobile computing device 310 may also include thereon a cloud print driver, similarly to that of the client device 304. In some embodiments, the mobile computing device 310 may be configured to perform the same or similar operations as that of the client device 304. The mobile computing device 310 may receive a graphical code from the client device 304, which may later be rendered or otherwise displayed on a display of the mobile computing device 310.

In some embodiments, the mobile computing device 310 may include a biometric sensor, such as a fingerprint scanner, which may be used to authenticate a user of the mobile computing device 310. For example, instead of drawing a pattern on a touch screen of the mobile computing device 310 as described above, the mobile computing device 310 may prompt a user to scan the user's fingerprint, which may be used to authenticate or verify (i.e. two-factor authentication) a user.

It should be understood that the system 300 is an example system that is provided for explanatory purposes. Any number of mobile devices, computers, laptops, or other terminal apparatuses may be present and connected to the image forming apparatus 302 in a variety of ways.

IV. EXAMPLE METHODS

Figure 4:
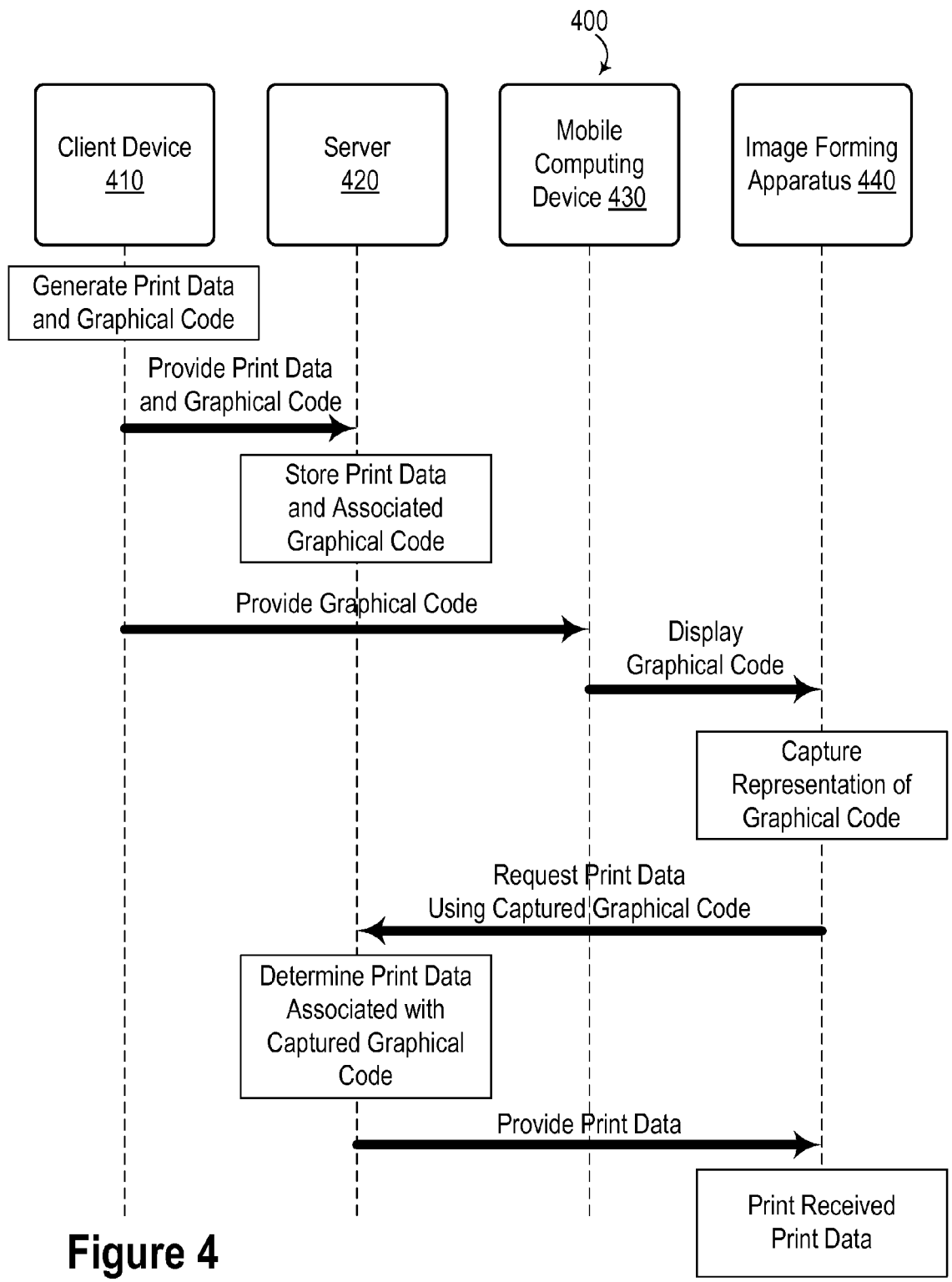
FIG. 4 is a data flow diagram illustrating a method, according to an example embodiment.

FIG. 4 is a data flow diagram 400 illustrating a method, according to an example embodiment. The data flow diagram 400 depicts information passing among the client device 410, server 420, mobile computing device 430, and image forming apparatus 440. More specifically, the data flow diagram 400 depicts a process through which print data and a graphical code is generated on a client device 410, stored on a server 420, displayed by the mobile computing device 430, captured by the image forming apparatus 440, and used to retrieve the print data stored on the server 420. Note that the data flow diagram 400 is merely depicts an example of data flow among the devices in the system; in various implementations, fewer or additional devices may be present and fewer or additional steps may be performed different from those depicted in FIG. 4 to accomplish the print data retrieval disclosed in the present application.

Note that client device 410 may be similar to or the same as client device 304, server 420 may be similar to or the same as client device 306, mobile computing device 430 may be similar to or the same as mobile computing device 310, and image forming apparatus 440 may be similar to or the same as image forming apparatus 308, image forming apparatus 200, and/or image forming apparatus 100.

First, the client device 410 generates print data and a graphical code. The client device 410 may generate the print data using a printer driver, such as a cloud print driver, installed on the client device 410. The print data may represent a particular document in a data format compatible with one or more printers. For example, print data may be raster data that, when provided to a printer, can be used to produce an image and/or text on a page. The generated graphical code may be any kind of image or optical machine-readable representation of data, as described above. The generated graphical code may be stored as data which may be used by the mobile computing device 430 to render the graphical code. The "graphical code" herein may refer to an image, an optical machine-readable representation of data, or data representative of an image or optical machine-readable representation of data.

Then, the client device 410 provides the print data and the graphical code to the server 420. The client device 410 may transmit the print data and graphical code over a network to the server 420. In some cases, the print data and graphical code may be transmitted to a server connected to the client device 410 via a wide area network, such as the Internet. The print data and graphical code may be encrypted or otherwise secured before being transmitted to the server 420.

Then, the server 420 stores the print data and graphical code received from the client device 410. This step may involve the server 420 creating a new entry into a database, where the entry includes the print data and the graphical code (or data representing the graphical code). If no database exists on the server 420, the server 420 may generate a new database including an entry with the print data and the graphical code.

Then, the client device 410 may provide the graphical code to the mobile computing device 430. The client device 410 may transmit to the mobile computing device 430 over a network to which both the client device 410 and the mobile computing device 430 are communicatively connected. In some implementations, the client device 410 may send the graphical code to the mobile computing device 430 using an e-mail service or other form of digital data messaging service.

In some embodiments, the client device 410 may render the graphical code on a display of the client device 410. A mobile computing device equipped with a camera may capture an image of the graphical code and store it to use for later retrieval of the print data. In some implementations, the mobile computing device 430 may recognize the graphical code and, instead of storing an image of the graphical code, store data representing the graphical code which can be used to render the graphical code on the mobile computing device 430.

Then, the mobile computing device 430 may display the graphical code. This step may involve either rendering the graphical code from data on the mobile computing device 430, or displaying an image captured by a camera of the mobile computing device 430. The display of the mobile computing device 430 may be oriented toward a camera of the image forming apparatus 440 during this step. In addition, other settings of the mobile computing device 430 may be temporarily modified. For example, when displaying the graphical code, the mobile computing device 430 may temporarily increase the brightness of the display, so that the graphical code may be more easily captured.

Then, the image forming apparatus 440 may capture a representation of the graphical code. The image forming apparatus 440 may record one or more images of the graphical code at this step. The image forming apparatus 440 may, in some instances, modify the captured images (e.g. changing the contrast or cropping the picture). In some embodiments, the image forming apparatus 440 may identify the graphical code from the captured image and extract data representative of the graphical code.

Then, the image forming apparatus 440 may request the server 420 for print data using the captured representation of the graphical code. The request may include either an image of the graphical code or the extracted data representative of the graphical code.

Then, the server 420 may determine print data associated with the captured representation of the graphical code. The server 420 may query or search a database stored thereon using the graphical code or with data representative of the graphical code, as described above.

Then, the server 420 may provide the print data to the image forming apparatus 440. The server 420 may, in the previous step, find a stored graphical code matching the captured graphical code in the database. The server 420 may then transmit the print data corresponding to that matching graphical code to the image forming apparatus 440.

Then, the image forming apparatus 440 may print out the received print data. This step may involve sending the print data, among other information, over a network from the server 420 to the image forming apparatus 440. In some cases, the server 420 may transmit, along with the print data, printer configuration settings that specify a manner in which to configure the image forming apparatus 440. The image forming apparatus 440 may print out the print data after applying such a configuration.

As described above, the server 420 may be incorporated within the image forming apparatus 440. In such embodiment, the data transmission between the server 420 and image forming apparatus 440 depicted in the data flow diagram 400 would be performed entirely within the image forming apparatus 440.

It should be understood that, although the operations in FIG. 4 appear to be performed in a particular order, the steps may be performed in a different order and/or certain steps may be performed simultaneously with other steps.

Figure 5:
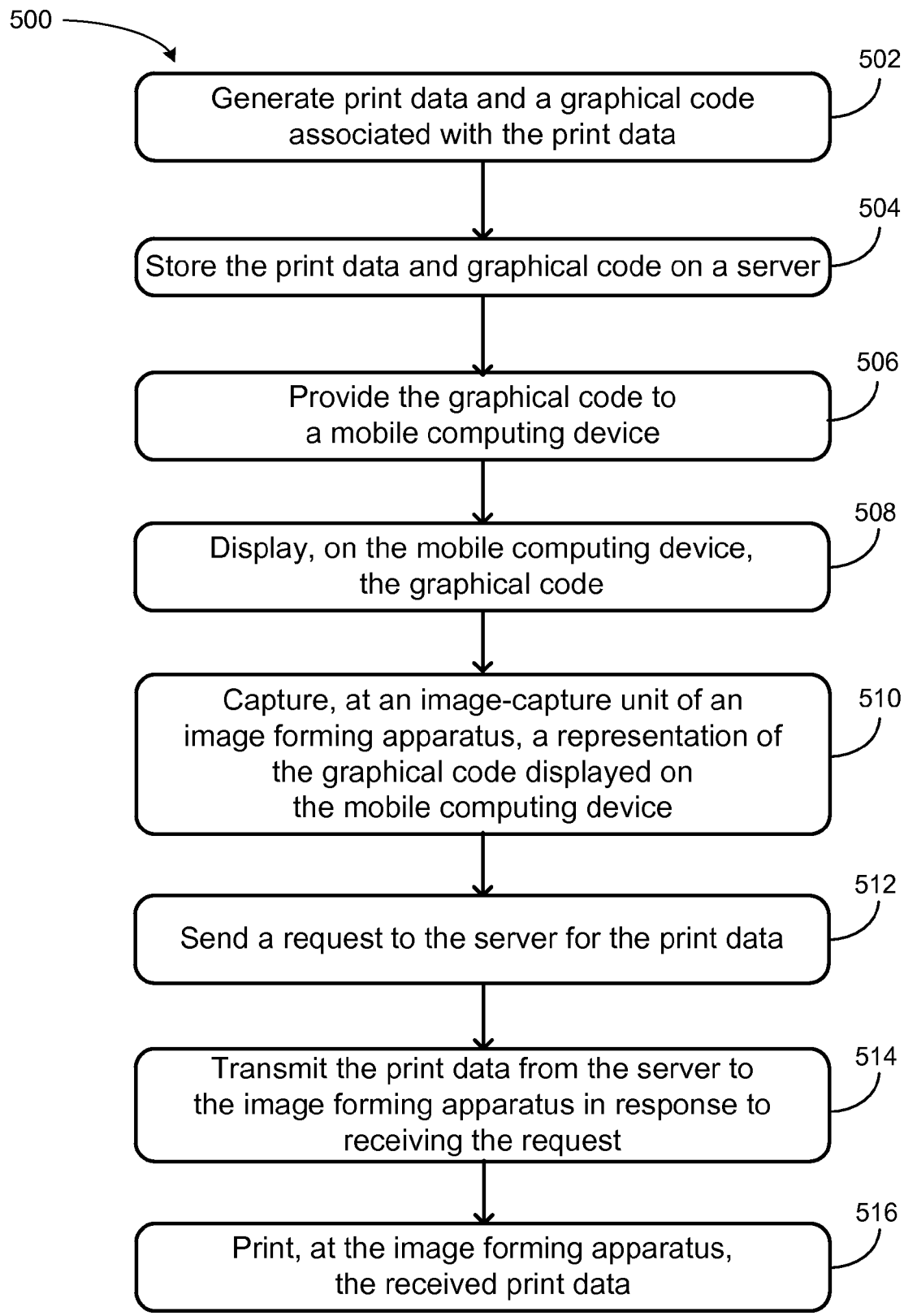
FIG. 5 is a flowchart illustrating a method, according to an example embodiment.

FIG. 5 is a flowchart illustrating a method 500, according to an example embodiment. The method 500 may be one example set of operations that collectively performs print data retrieval of the present application. Operations of method 500 may be performed on one or more devices in the system 300 shown in FIG. 3.

At step 502, the method 500 involves generating print data and a graphical code associated with the print data. A client device and/or a mobile computing device may utilize a cloud print driver to generate the print data and/or the graphical code. The cloud print driver may produce generic print data that can be printed out on a variety of printing devices. In some implementations, the cloud print driver may specify one or more printing devices.

Additionally, the cloud print driver may provide options for selecting printer configuration settings. The printer configuration settings may be embedded within the generated print data or provided as a separate configuration file. In some embodiments, multiple sets of printer configuration settings may be generated.

In some implementations, the graphical code may be generated using a pseudorandom number generator. In other implementations, the graphical code may be generated based on one or more factors, including the date, time, content of the document, content of the print data, and/or metadata associated with the document or print data, among other possible factors. Other possible techniques of generating the graphical code may also be implemented.

The graphical code may, in some cases, be an image selected by a user. The image may be selected at the time of generation of the print data. In some instances, a number of images may be displayed from which a particular image may be selected.

At step 504, the method 500 involves storing the print data and graphical code on a server. As described above, this step may involve adding an entry to a database containing the print data and the graphical code (or data representative of the graphical code). Other data storage techniques that associated the print data and graphical code may also be implemented.

At step 506, the method 500 involves providing the graphical code to a mobile computing device. As described above, this step may involve either transmitting the graphical code over a data or message delivery service (e.g. e-mail) or capturing the graphical code using a camera of the mobile computing device.

At step 508, the method 500 involves displaying, on the mobile computing device, the graphical code. As described above, this step may involve either rendering the received graphical code or displaying the captured graphical code.

At step 510, the method 500 involves capturing, at an image-capture unit of an image forming apparatus, a representation of the graphical code displayed on the mobile computing device. In some embodiments, the image-capture unit is a camera. In some instances, an option on the image forming apparatus may be selected to initiate the operation of the image-capture unit and wait for a graphical code to be placed within view of the image-capture unit. In other instances, the image-capture unit may operate continuously (or semi-continuously), and captures the representation of the graphical code in response to detecting a graphical code. In some embodiments, the image-capture unit may be in a standby mode, and is activated in response to a user approaching the image forming apparatus, for example.

An image captured in step 510 may be stored on a memory or other storage device of the image forming apparatus. In some instances, the image forming apparatus may process a captured image to recognize the graphical code in the image; in such instances, the graphical code or data representative of the graphical code may be stored, while the original image is discarded. Regardless of the particular implementation, information related to the graphical code that may be used to request print data may be stored.

At step 512, the method 500 involves sending a request to the server for the print data. The request may include the graphical code or data representative of the graphical code, which can subsequently be used by the server to identify associated print data. The server may utilize the received request and the data included therewith to determine the associated print data.

At step 514, the method 500 involves transmitting the print data from the server to the image forming apparatus in response to receiving the request. Step 514 may be performed by the server upon identifying a matching graphical code and associated print data. In some embodiments, a copy of the print data may be transmitted to the image forming apparatus, while the server continues to store the print data and associated graphical code. In other embodiments, after transmitting the print data, the server may remove the print data stored thereon.

At step 516, the method 500 involves printing, at the image forming apparatus, the received print data. The image forming apparatus may, in some instances, apply printer configuration settings received with the print data before printing out the print data. The image forming apparatus may print out the print data on a variety of printing mediums, such as paper.

Figure 6:
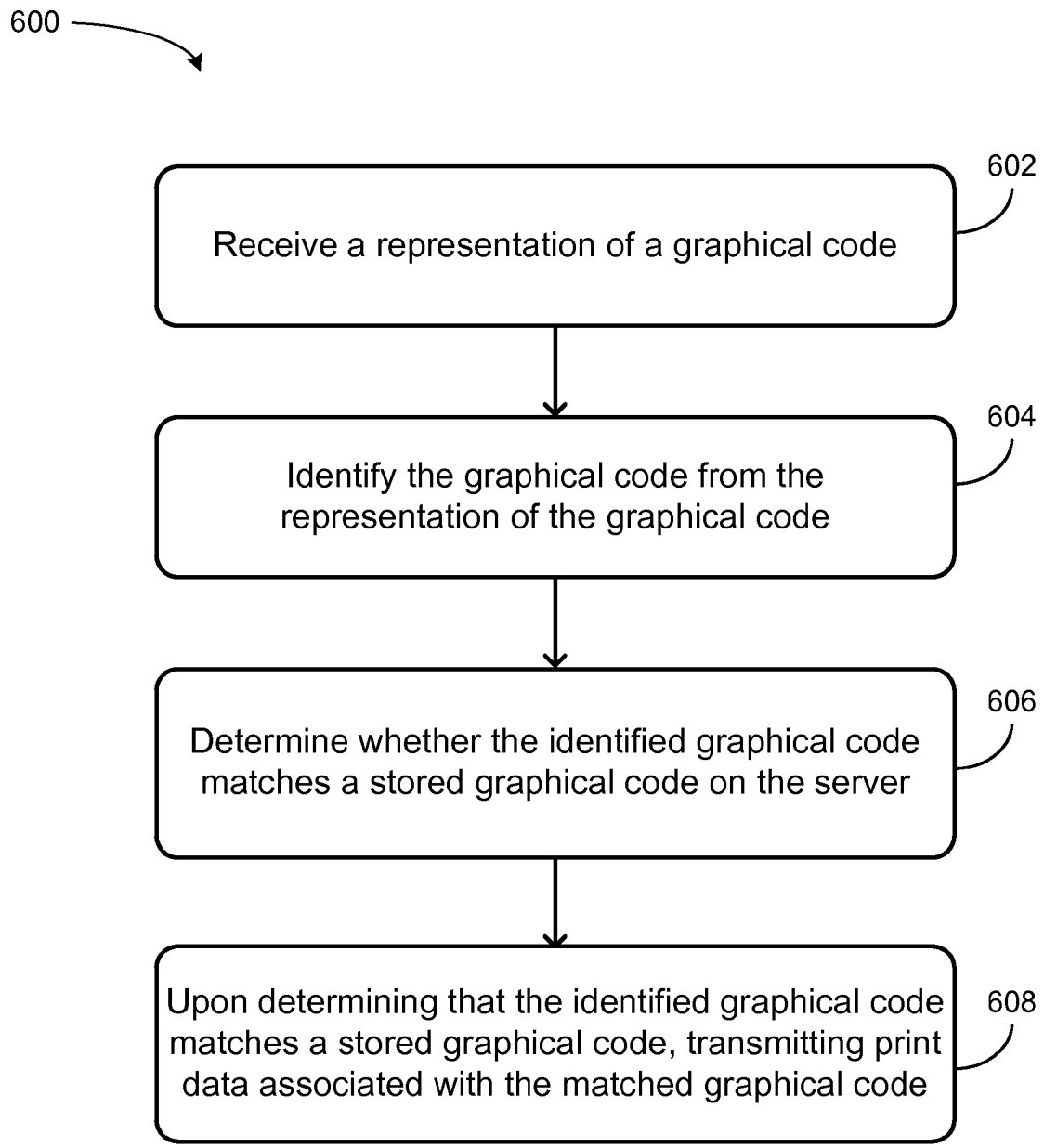
FIG. 6 is a flowchart illustrating a method, according to an example embodiment.

FIG. 6 is a flowchart illustrating a method 600, according to an example embodiment. The method 600 may be one example set of operations that finds a stored graphical code that matches a received graphical code. Operations of method 500 may be performed on one or more devices in the system 300 shown in FIG. 3.

At step 602, the method 600 involves receiving a representation of a graphical code. This representation of the graphical code may be a captured image that includes, among other things, the graphical code. The graphical code may be rendered on a display unit of a device, such as a mobile computing device.

At step 604, the method 600 involves identifying the graphical code from the representation of the graphical code. Step 604 may involve determining a portion of a captured image that contains the graphical code. Various object recognition techniques may be utilized in order to identify this image portion.

As one example, the graphical code may be a quick response (QR) code. In this example, the step 604 may involve identifying one or more features of the QR code (e.g. three corner squares) in order to identify its location and orientation within an image. In implementations where the graphical code is a visual representation of data, step 604 may involve processing the image portion containing the graphical code to determine that data.

At step 606, the method 600 involves determining whether the identified graphical code matches a stored graphical code on the server. In instances where the graphical code is a visual representation of data, step 606 may involve comparing the determined graphical code data with stored graphical code data to find an exact match. In instances where the graphical code is an isolated portion of an image containing the graphical code, a comparison of the image portion with stored image portions may be performed to determine the similarity of the captured image portion with one or more stored image portions. Various machine-learning techniques or other image processing techniques may be utilized in determining an extent of similarity between the captured image portion and one or more stored image portions. In such cases, a match may be determined if an extent of similarity between the captured image portion and a stored image portion exceeds a threshold similarity (e.g. above 90% similarity).

At step 608, the method 600 involves transmitting print data associated with the matched graphical code upon determining that the identified graphical code matches a stored graphical code.

IV. Example Implementations

Figure 7:
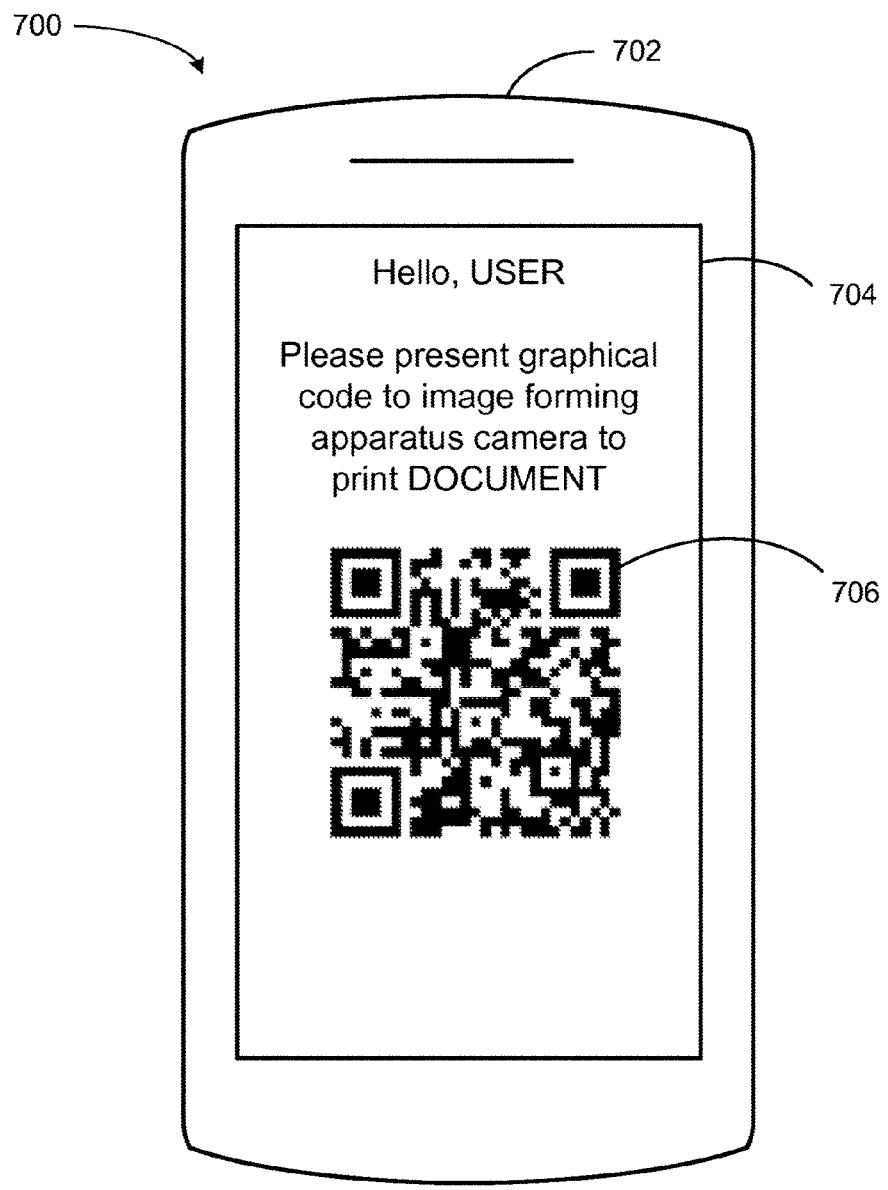
FIG. 7 is a schematic diagram illustrating an example graphical code displayed on a mobile computing device, according to an example embodiment.

FIG. 7 is a schematic diagram 700 illustrating an example graphical code displayed on a mobile computing device 702. The mobile computing device 702 may include a display unit 704, which may also incorporate a touch screen in some embodiments. In the example depicted in FIG. 7, the mobile computing device 702 is rendering a graphical code 706 associated with DOCUMENT on the display unit 704. In this example, the graphical code 706 may be captured or scanned by an image-capture device, such as a camera, of an image forming apparatus. In some embodiments, the graphical code 706 may also include information embedded therein that authenticates USER at the image forming apparatus as well.

It should be understood that the examples described with respect to FIG. 6 are merely example operations. Other operations may also be performed without departing from the scope of this application.

V. Variations

In some instances, generating the print data and graphical code may be performed on a networked server. For example, a networked server may have stored thereon a document. A client device or mobile computing device may access the networked server, select that document, and instruct the networked server to generate the print data and the graphical code. In some implementations, the networked server includes a cloud print driver to facilitate this operation. Then, the networked server may transmit the graphical code to the mobile computing device.

In instances where print configuration settings are stored on a networked server along with the print data and graphical code, a client device or mobile computing device may access the networked server and modify the stored print configuration settings. For example, a user may initially wish to print a document double-sided, but later decides to print the document single-sided. The user may instruct the networked server to modify the print configuration settings accordingly for the print data using a client device or mobile computing device.

In some embodiments, the graphical code may embed therein, in addition to an identifier for particular print data, print configuration settings. An image forming apparatus may capture an image of such a graphical code, determine the identifier for the particular print data and print configuration settings, retrieve the particular print data, and print out the retrieved print data using the print configuration settings provided in the graphical code.

In some implementations, a client device or mobile computing device may display a preview of the print data prior to printing out the print data. The client device or mobile computing device may be prompted for user input to verify that the print data to be printed is the desired document.

In some instances, a mobile computing device may provide multiple sets of print configuration settings from which a particular set of print configuration settings can be applied when printing out retrieved print data. These multiple print configuration settings may be stored in association with the print data, or provided as default configurations by the image forming apparatus.

In some implementations, a mobile computing device may provide selectable print configuration options from which a user may input a desired set of print configuration settings. Upon entering the desired print configuration options, the mobile computing device may generate or render a graphical code associated with print data that embeds therein the entered print configuration settings.

In some cases, multiple versions of particular print data may be stored on a server. Each version may represent slight variations between documents, such as different revisions of a certain document. The mobile computing device may provide a prompt for a user to select a desired version, and subsequently render a graphical code that can be used to retrieve and print that desired version of the print data.

In some instances, a user may wish to print a particular document, but the user's mobile computing device does not have stored thereon the associated graphical code. The mobile computing device may connect to a networked server and request to receive the graphical code associated with the desired print data. Such a process may require authentication of the user before the server transmits the graphical code to the user's mobile device.

In some instances, an image forming apparatus may not have an image-capture device or camera capable of capturing a graphical code displayed on a mobile computing device. In such instances, the mobile computing device may transmit the graphical code to the image forming apparatus via e-mail or another data delivery service.

In some embodiments, the functionality of the server described in this application is incorporated within a particular image forming apparatus. In an example set of operations, a client device may generate the print data and graphical code, transmit both of them to that particular image forming apparatus, and provide the graphical code to the mobile computing device (i.e. the mobile computing device captures an image of the graphical code with its camera or receives a transmission of data representative of the graphical code). The particular image forming apparatus may store the generated print data and graphical code on its data storage device. In these embodiments, when the particular image forming apparatus captures a representation of the graphical code displayed on the mobile computing device, no requests to external servers are performed to retrieve the print data. Instead, the particular image forming apparatus compares the captured representation of the graphical code to the graphical codes stored thereon. If a match is found, the associated print data is then printed by the image forming apparatus. In some instances, the image forming apparatus also verifies, authenticates, or otherwise identifies the user and ensures that the user is permitted to perform the printing operation.

In some embodiments, the server storing the graphical codes and print data is a cloud server accessible over a wide area network, such as the Internet. In an example set of operations, a client device within an office environment generates a print job and associated graphical code, transmits them to be stored on the cloud server, and provides the graphical code to a mobile computing device. A user may use the mobile computing device to display the graphical code to a printing device outside of the office environment—such as a printing service shop or a different office environment—to print out the previously-generated print job. In this manner, the mobile computing device may be able to securely and easily execute a print job at a remote location without having to use the mobile device's local storage, locate the print job's location on a cloud server, or enter in login credentials to perform authentication.

VI. Conclusion

The above detailed description describes various features and functions of the disclosed systems, devices, and methods with reference to the accompanying figures. While various aspects and embodiments have been disclosed herein, other aspects and embodiments will be apparent. The various aspects and embodiments disclosed herein are for purposes of illustration and are not intended to be limiting, with the true scope being indicated by the following claims.

What is claimed is:

1. A system comprising a client device, a mobile computing device, a server, and an image forming apparatus,
    wherein the client device is configured to:
        generate print data and a graphical code associated with the print data, wherein the print data is a printable representation of a document;
        transmit the print data and the graphical code to the server; and
        provide the graphical code to the mobile computing device,
    wherein the server is configured to:
        store the print data and the associated graphical code received from the client device; and
        provide the print data to the image forming apparatus in response to receiving from the image forming apparatus a request comprising a captured representation of the graphical code,
    wherein the mobile computing device comprises a display unit and is configured to:
        display on the display unit the graphical code received from the client device, and
    wherein the image forming apparatus comprises an image-capture unit and is configured to:
        capture, via the image-capture unit, a representation of the graphical code displayed on the mobile computing device;
        send a request to the server for the print data, wherein the request comprises the captured representation of the graphical code;
        receive the print data from the server; and
        print the print data.

2. The system of claim 1, wherein the client device comprises a cloud print driver, and wherein the client device is further configured to:
    generate the graphical code using the cloud print driver based on the document.

3. The system of claim 1, wherein providing the graphical code to the mobile computing device comprises:
    transmitting data representative of the graphical code from the client device to the mobile computing device.

4. The system of claim 1, wherein the mobile computing device further comprises a camera, wherein the client device comprises a display unit, and wherein providing the graphical code to the mobile computing device comprises:
    displaying, on the display unit of the client device, the graphical code; and
    capturing, via the camera of the mobile computing device, a representation of the graphical code.

5. The system of claim 1, wherein the graphical code is a two-dimensional matrix barcode.

6. A method comprising:
    generating, at a client device, print data and a graphical code associated with the print data, wherein the print data is a printable representation of a document;
    storing, at a server, the print data and the graphical code;
    providing the graphical code to a mobile computing device;
    displaying, on a display unit of the mobile computing device, the graphical code;
    capturing, at an image-capture unit of an image forming apparatus, a representation of the graphical code displayed on the display unit of the mobile computing device;
    sending, from the image forming apparatus, a request to the server for the print data, wherein the request comprises the captured representation of the graphical code;
    transmitting, from the server, the print data to the image forming apparatus in response to receiving the request; and
    printing, via a printing unit of the image forming apparatus, the print data.

7. The method of claim 6, further comprising:
    in response to receiving the request, identifying, at the server, the graphical code from the representation of the graphical code;
    determining that the identified graphical code matches a stored graphical code on the server; and
    upon determining that the identified graphical code matches the stored graphical code on the server, transmitting the print data to the image forming apparatus.

8. The method of claim 7, wherein determining that the identified graphical code matches a stored graphical code comprises:
    determining first data indicative of the stored graphical code;
    determining second data indicative of the identified graphical code; and
    determining that the identified graphical code matches the stored graphical code based on the first data being the same as the second data.

9. The method of claim 6, further comprising:
    receiving a selection of the document from a plurality of documents stored on the server; and
    providing the graphical code to the mobile computing device in response to receiving the selection of the document.

10. The method of claim 6, wherein the document is a particular version of the document from among a plurality of versions of the document, and wherein the method further comprises:
    selecting the particular version of the document from among the plurality of versions of the document stored on the server; and
    providing the graphical code to the mobile computing device in response to selecting the particular version of the document.

11. An image forming apparatus comprising:
a network interface communicatively coupled to a network;
an image-capture unit;
a printing unit; and
a processor configured to execute instructions, wherein the instructions comprise:
causing the image-capture unit to capture a representation of a graphical code displayed on a mobile computing device, wherein the graphical code is associated with print data, and wherein the graphical code and the print data were generated on a client device and stored on a server communicatively coupled to the network;
causing the image forming apparatus to send via the network interface to the server a request for print data, wherein the request comprises the captured representation of the graphical code;
receiving, from the server via the network interface, the print data associated with the graphical code; and
printing, via the printing unit, the received print data.

12. The image forming apparatus of claim 11, wherein the print data is associated with a particular user, wherein the graphical code is further indicative of user authentication information, and wherein the instructions further comprise:
determining the user authentication information from the graphical code; and
allowing the printing of the received print data based on the user authentication information matching the particular user associated with the print data.

13. The image forming apparatus of claim 12, wherein the instructions further comprise:
preventing the printing of the received print data based on the user authentication information not matching the particular user associated with the print data.

14. The image forming apparatus of claim 11, wherein the graphical code is further indicative of configuration setting information, and wherein the instructions further comprise:
determining the configuration setting information from the graphical code; and
configuring the image forming apparatus to print the received print data using the determined configuration setting information.

15. The image forming apparatus of claim 11, wherein the instructions further comprise:
receiving a representation of an entered touch-screen pattern from the mobile computing device, wherein the pattern is associated with the print data; and
determining that the received representation of the pattern matches the pattern associated with the print data,
wherein the request further comprises an indication that the received representation of the pattern matches the pattern associated with the print data.

* * * * *